(12) United States Patent
Floyd

(10) Patent No.: US 7,837,384 B2
(45) Date of Patent: Nov. 23, 2010

(54) PROCESS-INVARIANT LOW-QUIESCENT TEMPERATURE DETECTION CIRCUIT

(75) Inventor: Brian H. Floyd, Sunnyvale, CA (US)

(73) Assignee: Fairchild Semiconductor Corporation, South Portland, ME (US)

(*) Notice: Subject to any disclaimer, the term of this patent is extended or adjusted under 35 U.S.C. 154(b) by 365 days.

(21) Appl. No.: 12/004,279

(22) Filed: Dec. 19, 2007

(65) Prior Publication Data

US 2009/0161725 A1 Jun. 25, 2009

(51) Int. Cl.
*G01K 7/00* (2006.01)

(52) U.S. Cl. .................................... 374/178; 327/512

(58) Field of Classification Search ............... 374/178; 327/512
See application file for complete search history.

(56) References Cited

U.S. PATENT DOCUMENTS

| | | | |
|---|---|---|---|
| 5,039,878 A | 8/1991 | Armstrong et al. | |
| 5,063,342 A | 11/1991 | Hughes et al. | |
| 5,737,170 A | 4/1998 | Moyer | |
| 5,980,106 A | 11/1999 | Yamamoto et al. | |
| 6,084,462 A | 7/2000 | Barker | |
| 6,232,829 B1* | 5/2001 | Dow | 327/539 |
| 6,529,066 B1* | 3/2003 | Guenot et al. | 327/539 |
| 6,816,351 B1 | 11/2004 | Frank et al. | |
| 7,078,954 B2 | 7/2006 | Watanabe | |
| 2006/0104001 A1* | 5/2006 | Yoshio | 361/103 |
| 2006/0197581 A1* | 9/2006 | Chun et al. | 327/512 |
| 2007/0030049 A1* | 2/2007 | Yoshikawa | 327/512 |
| 2007/0120551 A1* | 5/2007 | Shin et al. | 324/105 |

* cited by examiner

*Primary Examiner*—Lisa M Caputo
*Assistant Examiner*—Mirellys Jagan
(74) *Attorney, Agent, or Firm*—Sidley Austin LLP

(57) ABSTRACT

In one embodiment, an integrated circuit is provided for detecting when a temperature reaches a specified value. The circuit includes a differential circuit block having first and second transistors. A control terminal of the first transistor is coupled to a first voltage source, and a control terminal of the second transistor is coupled to a second voltage source. The second transistor has an area larger than the first transistor. The differential circuit block compares a first current flowing into the first transistor and a second current flowing into the second transistor. The differential circuit block outputs a signal to indicate that the specified temperature has been reached when the first current equals the second current according to specified values of the first voltage source, the second voltage source, and the ratio of the areas of the first and second transistors. A single-ended circuit block amplifies the output signal of the differential circuit block to a predetermined amplitude.

13 Claims, 4 Drawing Sheets

US 7,837,384 B2

PROCESS-INVARIANT LOW-QUIESCENT TEMPERATURE DETECTION CIRCUIT

BACKGROUND OF THE INVENTION

1. Field of Invention

The present invention generally relates to the field of semiconductor integrated circuits (ICs), and more particularly, to a process-invariant temperature detection circuit.

2. Description of Related Art

An integrated circuit (IC) is a miniaturized electronic circuit consisting of a handful to millions of discrete electronic components fabricated on the surface of a thin substrate of semiconductor material. ICs are sometimes classified by the type of transistors used within the circuits. One type of transistor typically used in ICs is the bipolar junction transistor, which is an active semiconductor device formed by two p-n junctions. Another class of ICs are complementary metal-oxide-semiconductor (CMOS) devices. CMOS devices use metal-oxide-semiconductor field-effect transistors (MOSFETs), which are field-effect transistors comprised of a channel of p-type or n-type semiconductor material. An integrated circuit that uses both bipolar junction transistors and CMOS in a single device is known as a BiCMOS device.

A genre of circuits and systems require temperature sensing schemes to convert a temperature into a logic state. This logic state may be used to shut down the system or to raise a logic flag. For example, when a BiCMOS power integrated circuit is in operation, the transistors and other electronic components of the circuit dissipate heat. As the temperature approaches a certain level, the circuit may not operate as efficiently or may not perform as desired. In some situations, the circuit may even be damaged when it reaches a certain temperature. Therefore it is essential for many BiCMOS integrated circuits to include circuitry to detect a specific temperature in order to respond to these over temperature conditions.

Conventional BiCMOS temperature detection circuits are subject to variations in process parameters and considerable effort may be required to integrate the conventional temperature detection circuit into an IC. In addition, the conventional temperature detection circuit cannot be easily ported from one BiCMOS platform to another. When a different BiCMOS process is required, additional design and experimentation must be performed to integrate the temperature detection circuit into the new process.

SUMMARY OF THE INVENTION

In various embodiments, the present invention provides systems, circuitry, and methods for temperature detection independent of variations in process parameters. In one embodiment, a BiCMOS temperature detection circuit independent of variations in process parameters is provided.

In some embodiments, the detection circuit can be implemented with a current comparator having input voltages V1 and V2. The difference ($\Delta$V) between V1 and V2 will by design determine the target (or trip-point) temperature $T_T$. When the devices comprising the differential pair follow an exponential current law, the relationship between $\Delta$V and the trip-point temperature $T_T$ is linear and independent of process parameters. Examples of devices which follow an exponential current law are a bipolar transistor operating in the active (non-saturated) current region and a MOSFET operating in the sub-threshold region.

In accordance with the embodiments of the present invention, the supply current can be well controlled and limited by the "tail" current IT. This can be an advantage for battery operated systems which require low-quiescent current operation.

In accordance with one embodiment of the present invention, an integrated circuit is provided for detecting when a temperature reaches a specified value. The circuit includes a first transistor and a second transistor, each of which has a respective base, emitter, and collector. The second transistor has an area greater than the first transistor. The base of the first transistor is coupled to a first voltage source. The base of the second transistor is coupled to a second voltage source. The emitter of the second transistor is coupled to the emitter of the first transistor. An active load circuit block comprises first and second active load transistors. The first active load transistor provides a first current into the collector of the first transistor. The second active load transistor provides a second current into the collector of the second transistor. The first current is equal to the second current at the specified temperature according to selected values of the first voltage source, the second voltage source, the ratio of the areas of the first and second transistors, and the ratio of the areas of the first and second active load transistors.

In accordance with another embodiment of the present invention, an integrated circuit is provided for detecting when a temperature reaches a specified value. The circuit includes a differential circuit block having first and second transistors. A control terminal of the first transistor is coupled to a first voltage source, and a control terminal of the second transistor is coupled to a second voltage source. The second transistor has an area larger than the first transistor. The differential circuit block compares a first current flowing into the first transistor and a second current flowing into the second transistor. The differential circuit block outputs a signal to indicate that the specified temperature has been reached when the first current equals the second current according to specified values of the first voltage source, the second voltage source, and the ratio of the areas of the first and second transistors. A single-ended circuit block amplifies the output signal of the differential circuit block to a predetermined amplitude.

Important technical advantages of the present invention are readily apparent to one skilled in the art from the following figures, descriptions, and claims.

BRIEF DESCRIPTION OF DRAWINGS

For a more complete understanding of the present invention and for further features and advantages, reference is now made to the following description taken in conjunction with the accompanying drawings.

DETAILED DESCRIPTION OF THE EMBODIMENTS

Embodiments of the present invention and their advantages are best understood by referring to FIGS. 1 through 4 of the drawings. Like numerals are used for like and corresponding parts of the various drawings.

Figure 1:
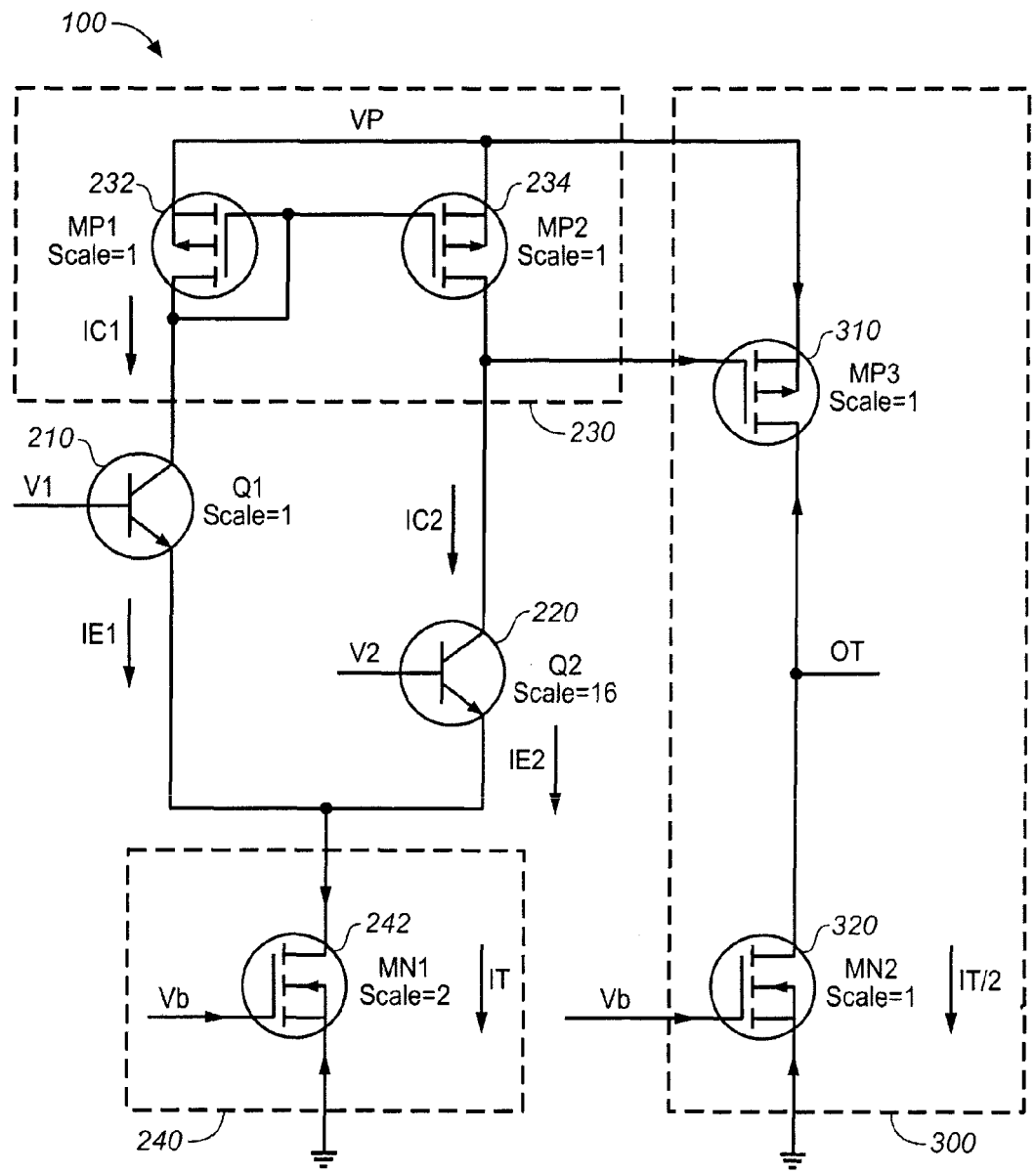
FIG. 1 is a schematic block diagram of an exemplary implementation for a temperature detection circuit, according to an embodiment of the invention.

FIG. 1 is a schematic block diagram of an exemplary implementation for a temperature detection circuit 100, according to an embodiment of the invention. In one embodiment, temperature detection circuit 100 can be implemented in BiCMOS technology.

As shown, the temperature detection circuit 100 may include a first bipolar transistor (Q1) 210, a second bipolar transistor (Q2) 220, an active load circuit block 230, a bias circuit block 240, and a single-ended output buffer circuit block 300.

Bipolar transistors 210 and 220 can be scaled such that the effective emitter area of transistor 220 is a magnitude m relative to that of transistor 210. According to one embodiment, the effective emitter area of transistor 220 is a scale 16:1 to that of transistor 210. The base of transistor 210 can be connected to a first voltage source $V_1$ and the base of the transistor 220 can be connected to a second voltage source $V_2$. In one embodiment, the first and second voltage sources $V_1$ and $V_2$ may have fixed values. It can be important that the difference between V1 and V2 is a predictable constant greater than zero. In this way, the target (trip-point) or threshold temperature ($T_t$) becomes a predictable value independent of process variation. A current $IC_1$ flows into the collector of the transistor 210 and a current $IC_2$ flows into the collector of the transistor 220. A current $IE_1$, flows from the emitter of the transistor 210 and a current $IE_2$ flows into the emitter of the transistor 220. A tail current IT is equal to the sum of the emitter currents IE1 and IE2. Because the tail current IT limits the circuit bias, the quiescent current can be made low, by design.

The bias circuit block 240 may include a transistor (MN1) 242 to conveniently generate the tail current IT. According to an exemplary embodiment of the present invention, transistor 242 is implemented as an n-channel MOSFET. The emitters of transistors 210 and 220 can be connected to the drain of transistor 242. The gate of the transistor 242 can be connected to a reference voltage $V_b$ and the source of the transistor 242 can be connected to ground.

The active-load circuit block 230 for the differential comparator may comprise p-channel MOSFET (MP1) 232 and p-channel MOSFET (MP2) 234. The sources of transistors 232 and 234 can be connected to a voltage supply rail $V_p$. The gate and drain of transistor 232 can be connected to the gate of transistor 234. In the operation of the active-load block circuit 230, the scale of the current flowing from transistor 232 is a factor n relative to that of the current flowing from transistor 234. According to the exemplary embodiment of the present invention in FIG. 1, the current flowing from transistor 232 has the same magnitude as the current flowing from transistor 234.

The single-ended output buffer block circuit block 300 may include a p-channel MOSFET (MP3) 310 and an n-channel MOSFET (MN2) 320. The gate of transistor 310 can be connected to the drain of transistor 234, the source of transistor 310 can be connected to the voltage source $V_p$, and the drain of transistor 310 can be connected to the output terminal OT. The gate of transistor 320 can be connected to a reference voltage $V_b$, the source of transistor 320 can be connected to ground, and the drain of transistor 320 can be connected to the output terminal OT and the drain of transistor 310.

The threshold temperature $T_T$, which can be set by a designer, is related to the voltage difference $\Delta V$ of the voltage sources $V_1$ and $V_2$ as defined by Equation (1) below, in which q is the amount of charge of electrons ($1.602 \times 10^{-19}$ coulomb), k is the Boltzmann constant ($1.38 \times 10^{-23}$ joule/kelvin), m is the scale of the emitter area of the second transistor 220 relative to the first transistor 210, and n is the scale of the current of the first active load transistor 232 relative to the current of the second active load transistor 234.

$$T_t = \frac{\Delta V \times q}{k \times \ln(m \times n)}. \tag{1}$$

The temperature detection circuit 100 operates such that the current flowing through transistor 210 is greater than the current flowing through transistor 220 (i.e., $IC_1 > IC_2$) when the temperature is less than the threshold temperature $T_T$. The current flowing through transistor 210 is less than the current flowing through transistor 220 (i.e., $IC_1 < IC_2$) when the temperature is greater than the threshold temperature $T_T$. In the example of FIG. 1, the current flowing through transistor 210 is equal to the current flowing through transistor 220 (i.e., $IC_1 = IC_2$) when the temperature of the circuit is equal to the threshold temperature $T_T$. The criterion is more generally described by equation 1 which quantifies the following design condition: the current in transistor Q2 220 will equal the current offered by transistor (MP2) 234 at the transition point. The current offered by transistor (MP2) 234, in turn, is related to the current in (Q1) 210 through the active load.

That is, under a normal operating condition, when the temperature of an integrated circuit incorporating the temperature detection circuit 100 is less than the threshold temperature $T_T$, the differential stage drives transistor 310 off (i.e., the gate-source voltage of transistor 310 is 0V. Accordingly, transistor 310 is in an off state and the output terminal OT is at a low level.

As the temperature in the integrated circuit incorporating the temperature detection circuit 100 rises, the demand for current in transistor 220 increases until it reaches the point where the current in transistor 234 will equal the current demanded from transistor 220. This condition defines the transition or threshold temperature $T_T$.

At the threshold temperature $T_T$, the differential stage forces transistor 310 to conduct. By design, the gain of the single-ended output stage (having transistor 310 and bias transistor 320) can be large and will cause a change in logic state at node OT. This signals that the semiconductor junction temperature has reached temperature $T_T$.

Thus, essentially, the output signal OT transitions from one voltage level (e.g., low) to another voltage level (e.g., high) when the temperature reaches the threshold temperature $T_T$.

Figure 2:
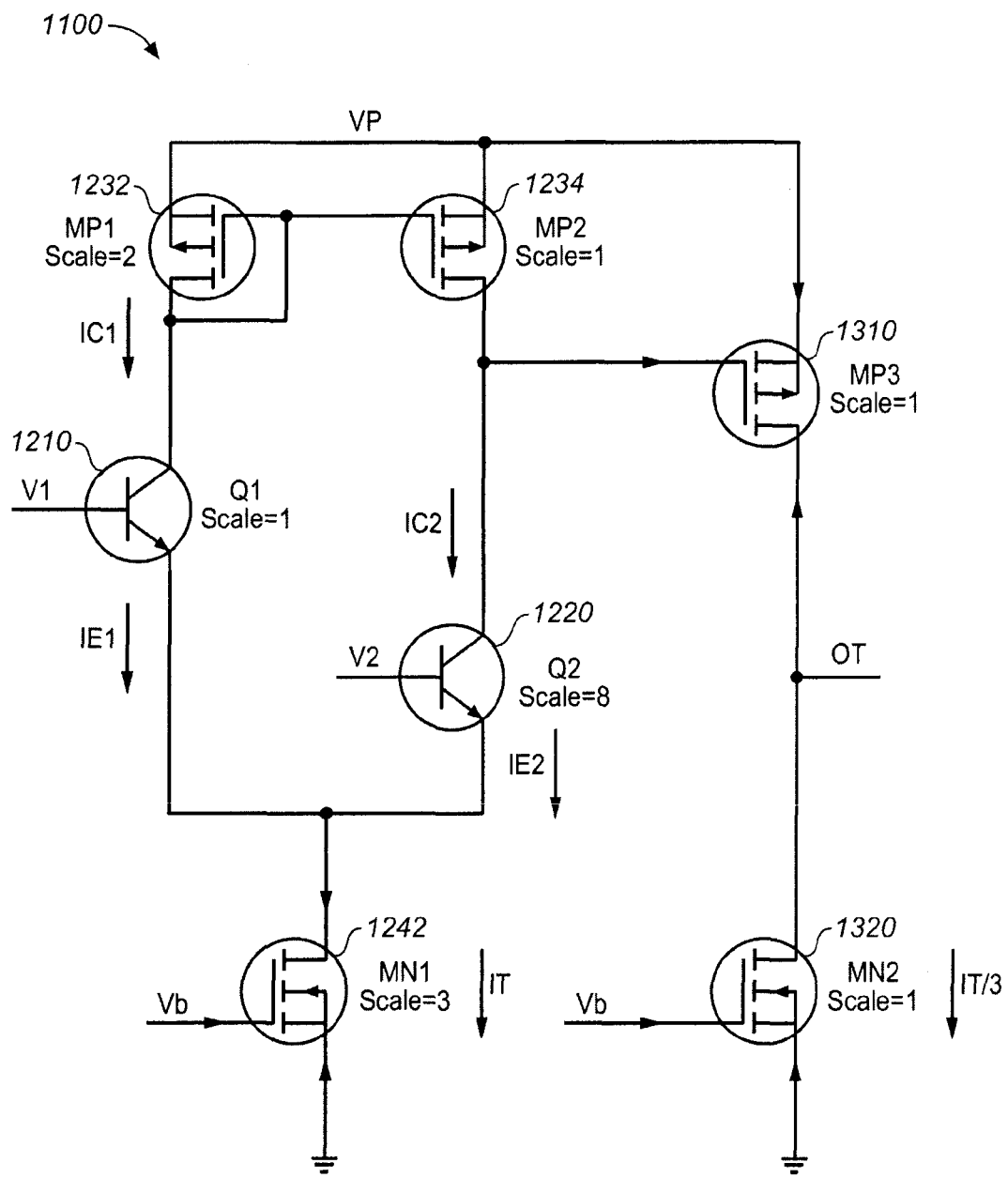
FIG. 2 is a schematic block diagram of another exemplary implementation for a temperature detection circuit, according to an embodiment of the invention.

FIG. 2 is a schematic block diagram of another exemplary implementation for a temperature detection circuit 100, according to an embodiment of the invention. This circuit 1100 uses a different area-scaling approach to reach the same result as the circuit 100 in FIG. 1. The implementation of circuit 1100 shown in FIG. 2 uses the same bipolar transistors with area scaling 8 and using the active load with area scaling 2. The resulting scale factor is again the number 16. This further illustrates that equation (1) above, which is a function of $\Delta V$ and the factor (m×n), gives the designer the freedom to choose values for n, m, V1, V2 (within common-mode ranges), and IT (tail current). Stated differently, once these values are selected, the comparator operating in its common-mode range will change state at the trip-point or threshold temperature $T_T$. As an advantage, the quiescent is controlled by the tail current bias-level IT.

Figure 3:
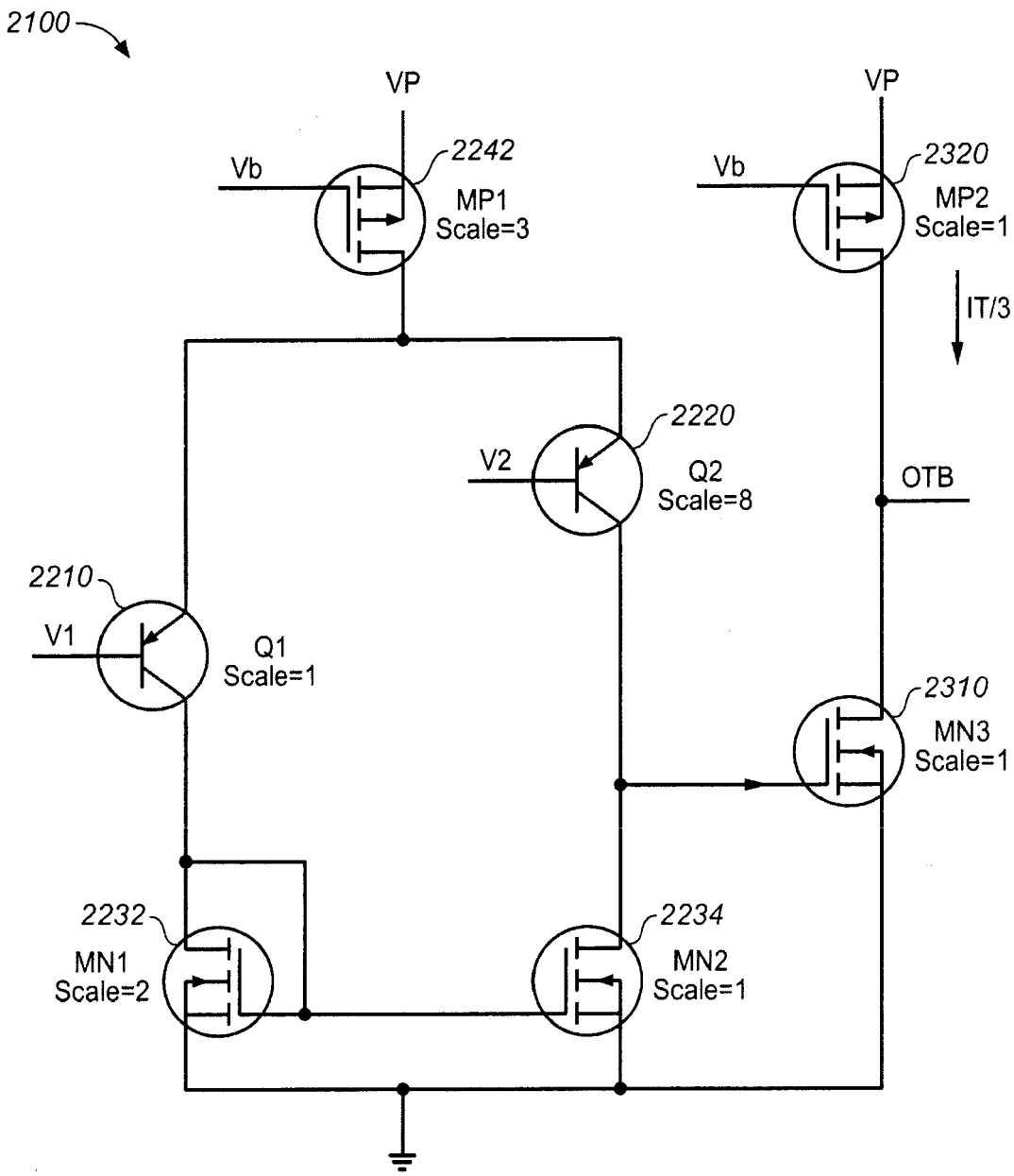
FIG. 3 is a schematic block diagram of yet another exemplary implementation for a temperature detection circuit according to an embodiment of the invention.

FIG. 3 is a schematic block diagram of yet another exemplary implementation for a temperature detection circuit 2100, according to an embodiment of the invention. As shown, circuit 2100 is a complementary PNP implementation of circuit 1100 depicted in FIG. 2. In this case, input voltage V2 will be greater than input voltage V1, and ΔV will be V2 minus V1. As with the other implementations, at the threshold temperature $T_T$, the differential stage forces a logic-state transition.

Figure 4:
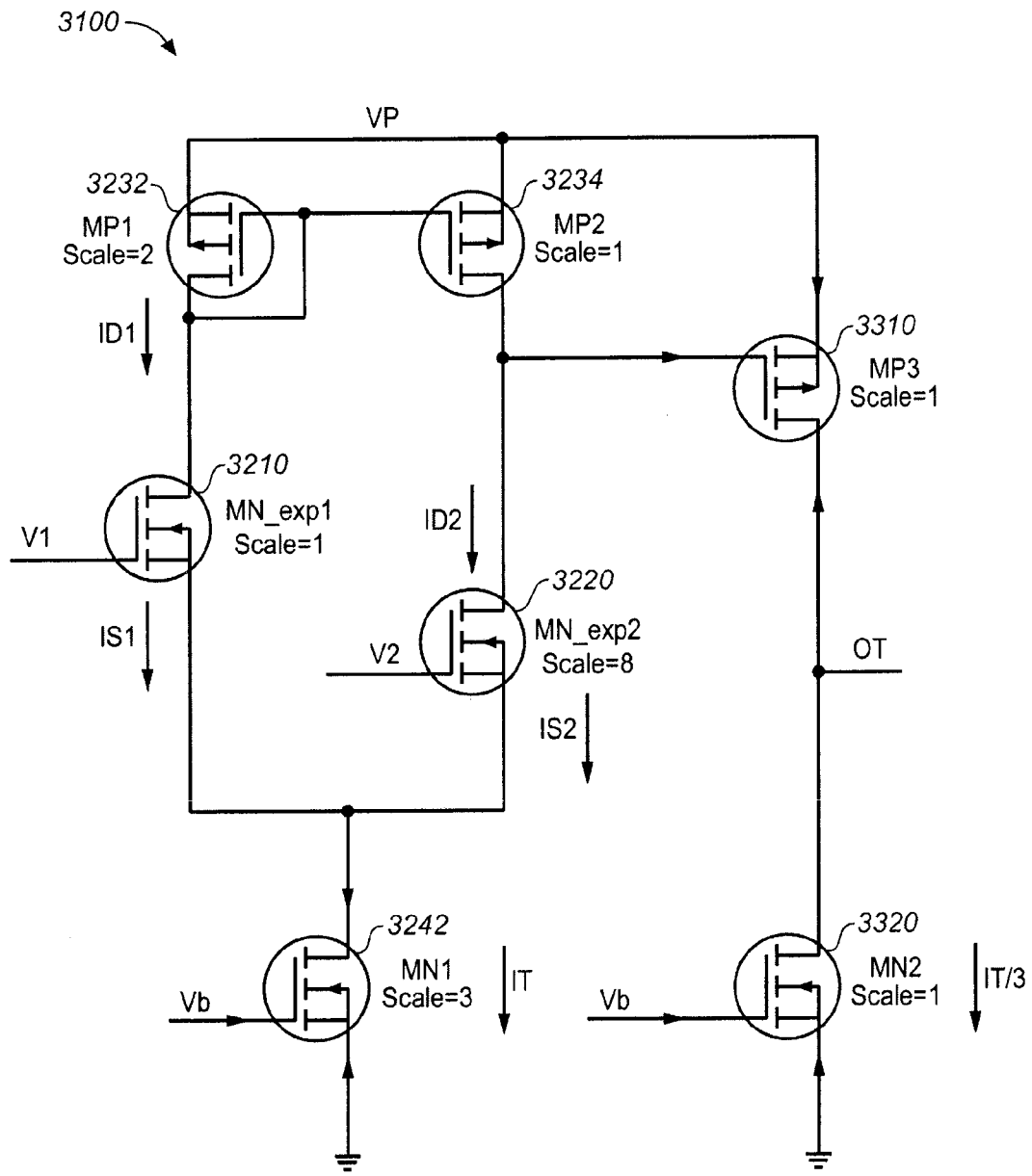
FIG. 4 is a schematic block diagram of still yet another exemplary implementation for a temperature detection circuit, according to an embodiment of the invention.

FIG. 4 is a schematic block diagram of still yet another exemplary implementation for a temperature detection circuit 3100, according to an embodiment of the invention. In this embodiment, circuit 3100 using an NMOS differential pair to replace the NPN bipolar transistors. That is, the implementation of FIG. 4 uses N-Channel MOSFETS 3210 and 3220 operating in the sub-threshold region (instead of bipolar transistors like that shown in FIG. 1). Since in theory NMOS transistors may be designed to operate in the sub-threshold exponential region, this embodiment also attains the desired result of equation (1). In other words, the tail current IT and the differential NMOS devices 3210 and 3220 (labeled MN_exp1 and MN_exp2, respectfully) are, by design, selected such that transistors 3210 and 3220 behave similar to bipolar transistors.

The temperature detection circuits 100, 1100, 2100, and 3100 can be used in various applications. For example, these temperature detection circuits can be used for over-temperature protection so that a system in which any such circuit 100, 1100, 2100, or 3100 shuts down before it overheats and causes permanent damage to the system.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. An integrated circuit for detecting when a temperature reaches a specified value comprising:
    a first transistor having a base, an emitter, and a collector, the base coupled to a first voltage source;
    a second transistor having a base, an emitter, and a collector, the second transistor having an area greater than the first transistor, the base of the second transistor coupled to a second voltage source, the emitter of the second transistor coupled to the emitter of the first transistor; and
    an active load circuit block comprising first and second active load transistors, the first active load transistor providing a first current into the collector of the first transistor, the second active load transistor providing a second current into the collector of the second transistor;
    wherein the first current is equal to the second current at the specified temperature according to selected values of the first voltage source, the second voltage source, the ratio of the areas of the first and second transistors, and the ratio of the areas of the first and second active load transistors.

2. The integrated circuit of claim 1, further comprising a bias circuit coupled to the emitter of the first transistor and the emitter of the second transistor.

3. The integrated circuit of claim 1, wherein the first active load transistor has a source, a gate, and a drain, the gate of the first active load transistor coupled to the drain and the collector of the first transistor; and the second active load transistor has a source, a gate, and a drain, the gate of the second active load transistor coupled to the gate of the first active load transistor, the source of the second active load transistor coupled to the source of the first active load transistor, the drain of the second active load transistor coupled to the collector of the second transistor.

4. The integrated circuit of claim 1, wherein the first current is equal to the second current according to the equation $T=(q/K)(V_1-V_2)/\ln(m \times n)$, wherein T is the specified temperature, q is the amount of charge of electrons, K is the Boltzmann constant, $V_1$ is the value of the first voltage source, $V_2$ is the value of the second voltage source, m is a scale of the second transistor relative to the first transistor, and n is the scale of the active load transistors relative to the first transistor.

5. The integrated circuit of claim 1, further comprising a single-ended output buffer circuit coupled to the active load circuit block, wherein the output buffer circuit outputs a voltage corresponding to a reference voltage when the first current is equal to the second current.

6. The integrated circuit of claim 5, wherein the output buffer circuit comprises an output transistor having a source, a gate, and a drain, the gate coupled to an [output] of the active load circuit block, the source coupled to an [input] of the active load circuit block, the drain coupled to the output terminal; and a bias circuit coupled to the drain of the output transistor.

7. An integrated circuit for detecting when a temperature reaches a specified value comprising:
    a differential circuit block comprising:
        first and second transistors, wherein a control terminal of the first transistor is coupled to a first voltage source and a control terminal of the second transistor is coupled to a second voltage source, the second transistor having an area larger than the first transistor, and
        an active load circuit block comprising first and second active load transistors, the first active load transistor providing a first current into the first transistor, the second active load transistor providing a second current into the second transistor,
    wherein the differential circuit block comparing the first current flowing into the first transistor and the second current flowing into the second transistor, the differential circuit block outputting a signal to indicate that the specified temperature has been reached when the first current equals the second current according to specified values of the first voltage source, the second voltage source, the ratio of the areas of the first and second transistors, and the ratio of the areas of the first and second active load transistors; and a single-ended circuit block amplifying the output signal of the differential circuit block to a predetermined amplitude.

8. The integrated circuit of claim 7, wherein the differential circuit block comprises first and second bipolar transistors, an active load circuit block, and a bias circuit.

9. The integrated circuit of claim 8, wherein the differential circuit block comprises first and second MOSFETs, an active load circuit block, and a bias circuit.

10. The integrated circuit of claim 8, wherein the active load circuit block comprises first and second MOSFETs, the gate of the first MOSFET coupled to the drain of the first MOSFET, the gate of the second MOSFET, and the collector of the first bipolar transistor; the source of the first MOSFET is coupled to the source of the second MOSFET; and the drain of the second MOSFET is coupled to the collector of the second bipolar transistor.

11. The integrated circuit of claim 8, wherein the bias circuit comprises a MOSFET, the gate coupled to a reference voltage, the source coupled to ground, and the drain coupled to the emitter of the first bipolar transistor and the emitter of the second bipolar transistor.

12. The integrated circuit of claim 8, wherein the single-ended circuit block comprises first and second MOSFETs, the gate of the first MOSFET coupled to the output of the differential circuit block, the source of the first MOSFET coupled to the input of the differential circuit block; the gate of the second MOSFET coupled to a reference voltage, the source of the second MOSFET coupled to ground; and an output terminal coupled to the drain of the first MOSFET and the drain of the second MOSFET.

13. An integrated circuit for detecting when a temperature reaches a specified value comprising:
a differential circuit block having first and second transistors, wherein a control terminal of the first transistor is coupled to a first voltage source and a control terminal of the second transistor is coupled to a second voltage source, the second transistor having an area larger than the first transistor, the differential circuit block comparing a first current flowing into the first transistor and a second current flowing into the second transistor, the differential circuit block outputting a signal to indicate that the specified temperature has been reached when the first current equals the second current according to specified values of the first voltage source, the second voltage source, and the ratio of the areas of the first and second transistors; and
a single-ended circuit block amplifying the output signal of the differential circuit block to a predetermined amplitude;
wherein the first current is equal to the second current according to the equation $T=(q/K)(V_1-V_2)/\ln(m \times n)$, wherein T is the specified temperature, q is the amount of charge of electrons, K is the Boltzmann constant, $V_1$ is the value of the first voltage source, $V_2$ is the value of the second voltage source, m is a scale of the second transistor relative to the first transistor, and n is the scale of the active load transistors relative to the first transistor.

* * * * *